(No Model.)

W. H. FOX.
SPRING PIN.

No. 270,410. Patented Jan. 9, 1883.

Witnesses:

Willard H. Fox,
By atty. Inventor

UNITED STATES PATENT OFFICE.

WILLARD H. FOX, OF NEW HAVEN, CONNECTICUT.

SPRING-PIN.

SPECIFICATION forming part of Letters Patent No. 270,410, dated January 9, 1883.

Application filed September 11, 1882. (No model.)

*To all whom it may concern:*

Be it known that I, WILLARD H. FOX, of New Haven, in the county of New Haven and State of Connecticut, have invented a new Improvement in Spring-Pins; and I do hereby declare the following, when taken in connection with accompanying drawings and the letters of reference marked thereon, to be a full, clear, and exact description of the same, and which said drawings constitute part of this specification, and represent, in—

Figure 1:
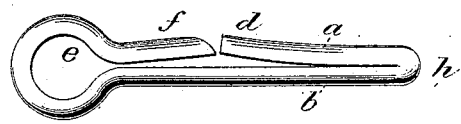
Figure 2:
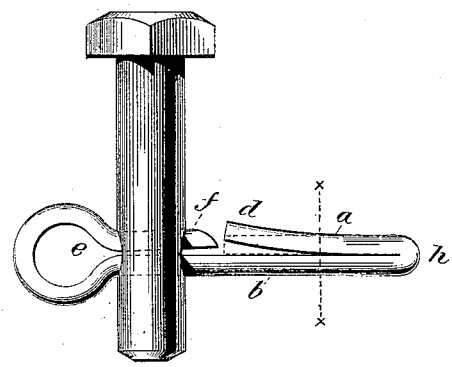
Figure 3:

Figure 1, a side view; Fig. 2, a side view showing the pin as applied to use; Fig. 3, a transverse section on line $x\ x$.

This invention relates to an improvement in that class of pins which are constructed to be introduced through a hole in a stud or axle to secure something upon that stud or axle, and in which, when in position, the pin is locked, so as to prevent its accidental removal, the object of the invention being to simplify the construction of the pin, and also to prevent the pin rattling in its seat when in place; and the invention consists in making the pin from half-round wire doubled one end back upon itself, so as to present the half-round surface outside, the end to form a spring-shoulder to lock the pin in place, the other end bent to form an eye or head, the end extending onto the body, so as to form a spring to make a frictional bearing for the pin when in place, and as more fully hereinafter described.

I take of half-round wire according to the size and length of the pin to be made. At one end I double the wire, bringing the end part, $a$, back onto the body part $b$, their flat surfaces toward each other, so as to present their half-round surface outward, as seen in Fig. 3. The extreme end, $d$, is turned outward away from the body of the pin to form a spring-shoulder. Near the other end the wire is bent to form an enlargement, head, or eye, $e$, the extreme end extending onto the body and slightly outward to form the spring $f$. The outer surface at the end is rounded or inclined, as shown. The pin being thus constructed, the doubled end $h$ is passed through the hole, the hole being substantially the size of that end of the pin, or a little larger. Forcing the pin through the hole depresses the spring or shoulder end $d$, as seen in broken lines, Fig. 2, until that shoulder or end passes beyond the hole. Then it will spring outward, so as to prevent the removal of the pin unless that end be mechanically depressed. As the pin passes into the hole the head end of the spring enters the hole, caused so to do by its inclination, and its entrance forces that part of the pin toward the body part $f$ and contracts its extent. That part therefore creates a spring-pressure in the hole sufficient to prevent its rattling.

The part $f$ may be closed tight down upon the part $b$, and is not essential to the spring portion $d$; but I prefer to make both ends $f$ and $d$ as a spring.

I claim—

1. The herein-described spring-pin made from half round wire, one end turned back upon the body, the flat sides toward each other to form the spring-shoulder $d$, and doubled at the other end to form the enlargement $e$, substantially as described.

2. The herein-described spring-pin made from half-round wire, one end turned back upon the body, the flat sides toward each other to form the spring-shoulder $d$, and doubled at the other end to form the enlargement $e$, the end from the head extended to form the spring $f$, substantially as described.

WILLARD H. FOX.

Witnesses:
JOHN E. EARLE,
LILLIAN D. KELSEY.